(12) United States Patent
Agardh et al.

(10) Patent No.: US 10,264,448 B2
(45) Date of Patent: Apr. 16, 2019

(54) METHOD AND APPARATUS FOR FACILITATING USE OF SERVICES AVAILABLE VIA WIRELESS CONNECTION

(71) Applicant: Sony Corporation, Tokyo (JP)

(72) Inventors: Kåre Agardh, Rydebäck (SE); Anders Mellqvist, Malmö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 181 days.

(21) Appl. No.: 14/364,054

(22) PCT Filed: Dec. 17, 2013

(86) PCT No.: PCT/IB2013/061051
§ 371 (c)(1),
(2) Date: Jun. 9, 2014

(87) PCT Pub. No.: WO2015/092484
PCT Pub. Date: Jun. 25, 2015

(65) Prior Publication Data
US 2016/0302060 A1 Oct. 13, 2016

(51) Int. Cl.
*H04W 12/04* (2009.01)
*H04W 4/80* (2018.01)
(Continued)

(52) U.S. Cl.
CPC .......... *H04W 12/04* (2013.01); *H04L 12/281* (2013.01); *H04L 12/2809* (2013.01);
(Continued)

(58) Field of Classification Search
CPC .................................................. H04W 12/04
See application file for complete search history.

(56) References Cited

U.S. PATENT DOCUMENTS 8,165,102 B1 * 4/2012 Vleugels ............... H04W 88/08
370/338
8,681,691 B2 * 3/2014 Shen ..................... H04W 76/02
370/328
(Continued)

FOREIGN PATENT DOCUMENTS

EP 2509343 A2 10/2012
EP 2615869 A1 7/2013
(Continued)

OTHER PUBLICATIONS

Bluetooth, "Core System Package [Low Energy Controller volume]", Specification of the Bluetooth System, Covered Core Package version: 4.0, Jun. 30, 2010, pp. 1-138, XP055107856.
(Continued)

*Primary Examiner* — Andrew Lai
*Assistant Examiner* — Andrew C Lee
(74) *Attorney, Agent, or Firm* — Tucker Ellis LLP (57) ABSTRACT

A method is disclosed for facilitating service usage by a wireless terminal. The method is implemented by a Bluetooth low energy (BLE) beacon. The BLE beacon obtains service information describing a service available via a non-BLE wireless connection to a wireless access point. The BLE beacon also obtains connectivity information for establishing the non-BLE wireless connection, for utilizing the service via the non-BLE wireless connection, or both. The BLE beacon periodically broadcasts the service information and connectivity information via BLE transmissions to a wireless terminal that lacks the non-BLE connection. A corresponding BLE beacon operative to implement the method is also disclosed.

18 Claims, 5 Drawing Sheets

(51) Int. Cl.
*H04L 29/08* (2006.01)
*H04L 12/28* (2006.01)
*H04L 29/06* (2006.01)
*H04W 8/00* (2009.01)
*H04W 48/10* (2009.01)
*H04W 84/12* (2009.01)

(52) U.S. Cl.
CPC .............. *H04L 67/16* (2013.01); *H04L 69/18* (2013.01); *H04W 4/80* (2018.02); *H04W 8/005* (2013.01); *H04W 48/10* (2013.01); *H04L 69/24* (2013.01); *H04L 2012/2841* (2013.01); *H04W 84/12* (2013.01)

(56) References Cited

U.S. PATENT DOCUMENTS

| | | | | |
|---|---|---|---|---|
| 8,725,138 B2* | 5/2014 | Lee | ....................... | H04W 48/08 455/432.1 |
| 8,767,692 B2* | 7/2014 | Kim | ..................... | H04W 76/023 370/328 |
| 2002/0132614 A1* | 9/2002 | Vanluijt | ................ | G06Q 20/382 455/414.1 |
| 2003/0112789 A1* | 6/2003 | Heinonen | ............. | H04W 28/16 370/349 |
| 2005/0215601 A1* | 9/2005 | Aono | ................... | A61K 31/165 514/357 |
| 2006/0075131 A1* | 4/2006 | Douglas | ................ | G01S 5/0252 709/230 |
| 2008/0181154 A1* | 7/2008 | Sherman | ............... | H04W 48/16 370/311 |
| 2008/0310371 A1* | 12/2008 | Russell | ............. | H04W 36/0066 370/331 |
| 2008/0311957 A1* | 12/2008 | Jantunen | ............... | H04W 8/005 455/560 |
| 2009/0137206 A1* | 5/2009 | Sherman | ............... | H04W 16/14 455/41.2 |
| 2010/0317289 A1* | 12/2010 | Desai | ................... | H04B 17/318 455/41.2 |
| 2011/0044304 A1* | 2/2011 | Connelly | .......... | H04W 36/0033 370/338 |
| 2012/0201213 A1* | 8/2012 | Banerjea | ........... | H04W 72/0453 370/329 |
| 2012/0265913 A1 | 10/2012 | Suumäki et al. | | |
| 2013/0095789 A1* | 4/2013 | Keevill | ................. | H04W 12/06 455/411 |
| 2013/0109313 A1* | 5/2013 | Kneckt | ................. | H04W 8/005 455/41.2 |
| 2014/0010107 A1* | 1/2014 | Chikkappa | .............. | H04W 4/06 370/254 |
| 2014/0071959 A1* | 3/2014 | Ghosh | ............... | H04W 72/0426 370/336 |
| 2014/0079022 A1* | 3/2014 | Wang | .................... | H04W 36/22 370/331 |
| 2014/0126461 A1* | 5/2014 | Ghosh | ................... | H04W 88/04 370/315 |
| 2014/0148099 A1* | 5/2014 | Reunamaki | ....... | H04W 52/0209 455/41.2 |
| 2014/0194062 A1* | 7/2014 | Palin | .................... | H04W 4/008 455/41.2 |
| 2015/0023245 A1* | 1/2015 | Du | .................... | H04W 28/0205 370/315 |
| 2015/0172901 A1* | 6/2015 | Kasslin | ................. | H04W 4/008 370/328 |

FOREIGN PATENT DOCUMENTS

EP  2665237 A1  11/2013
WO  2007057758 A2  5/2007

OTHER PUBLICATIONS

International Search Report dated Apr. 16, 2014 in re International Application No. PCT/IB2013/061051 filed Dec. 17, 2013.
European Office Action to European Application No. 13828989.7, dated Jul. 26, 2016.
European Office Action to European Application No. 13826989.7, dated Mar. 31, 2017.

* cited by examiner

*FIG. 7*

METHOD AND APPARATUS FOR FACILITATING USE OF SERVICES AVAILABLE VIA WIRELESS CONNECTION

TECHNICAL FIELD

The present disclosure relates to facilitating service usage, and more particularly relates to a Bluetooth low energy (BLE) beacon that broadcasts service information and connectivity information via BLE transmissions to facilitate usage of a service available via a non-BLE wireless connection.

BACKGROUND

When a wireless terminal enters a new environment (e.g., a hotel), the wireless terminal may be unaware of useful services available through a wireless connection in that environment. For example, a wireless terminal may be entirely unaware that the hotel room includes Wireless Local Area Network (WLAN) enabled speakers available for playing music through a WLAN connection. Even if a wireless terminal user knows that such speakers are available, the user may not know how to connect to them.

Also, when a guest enters a friend's home, the friend may wish to share credentials with the guest for accessing services in their home. For example, if a homeowner has a subscription to a music service (e.g., "Music Unlimited" from SONY) or a video streaming service (e.g., "Video Unlimited" from SONY), it may be desirable to permit the guest to use those services while they remain in their friend's home. However, the guest may be unaware that their friend possesses credentials for those services.

SUMMARY

According to one aspect of the present disclosure, a method of facilitating service usage by a wireless terminal is disclosed, with the method being implemented by a Bluetooth low energy (BLE) beacon. Service information is obtained that describes a service available via a non-BLE wireless connection to a wireless access point. Connectivity information is obtained for establishing the non-BLE wireless connection, for utilizing the service via the non-BLE wireless connection, or both. The service information and connectivity information are periodically broadcasted via BLE transmissions to a wireless terminal that lacks the non-BLE wireless connection.

According to another aspect of the present disclosure, a Bluetooth low energy (BLE) beacon is disclosed. The BLE beacon includes a transceiver, and one or more processing circuits configured to obtain service information describing a service available via a non-BLE wireless connection to a wireless access point. The one or more processing circuits are further configured to obtain connectivity information for establishing the non-BLE wireless connection, for utilizing the service via the non-BLE wireless connection, or both. The one or more processing circuits are further configured to periodically broadcast the service information and connectivity information via BLE transmissions from the transceiver to a wireless terminal that lacks the non-BLE wireless connection.

Of course, the present disclosure is not limited to the above features and advantages. Indeed, those skilled in the art will recognize additional features and advantages upon reading the following detailed description, and upon viewing the accompanying drawings.

DETAILED DESCRIPTION

Bluetooth Low Energy (BLE) is one of the latest enhancements to the Bluetooth® specifications, and in the past was known as Wibree and Ultra Low Power (ULP). As detailed in the Bluetooth 4.0 and later specifications, BLE utilizes power efficient transmissions with short data packets that facilitate low power consumption. To accomplish this, BLE uses different physical and logical properties, as well as a different protocol stack, than so-called "classic Bluetooth" (i.e., Bluetooth Basic Rate (BR) and Bluetooth Enhanced Data Rate (EDR)). BLE is also marketed under the name of "Bluetooth Smart" and "Bluetooth Smart Ready."

The present disclosure describes a method for using a Bluetooth low energy (BLE) beacon for facilitating service usage by a wireless terminal. The BLE beacon obtains service information describing a service available via a non-BLE wireless connection, and also obtains connectivity information for establishing the non-BLE wireless connection and/or for utilizing the service via the non-BLE wireless connection. The service information and connectivity information are periodically broadcasted via BLE transmissions to a wireless terminal that lacks the non-BLE wireless connection, to facilitate the wireless terminal using the service. This method can be useful when a wireless terminal user is entering a new location, such as a hotel or a friend's home, and the user is unaware of what services are available and/or of how to connect to available services.

Figure 1:
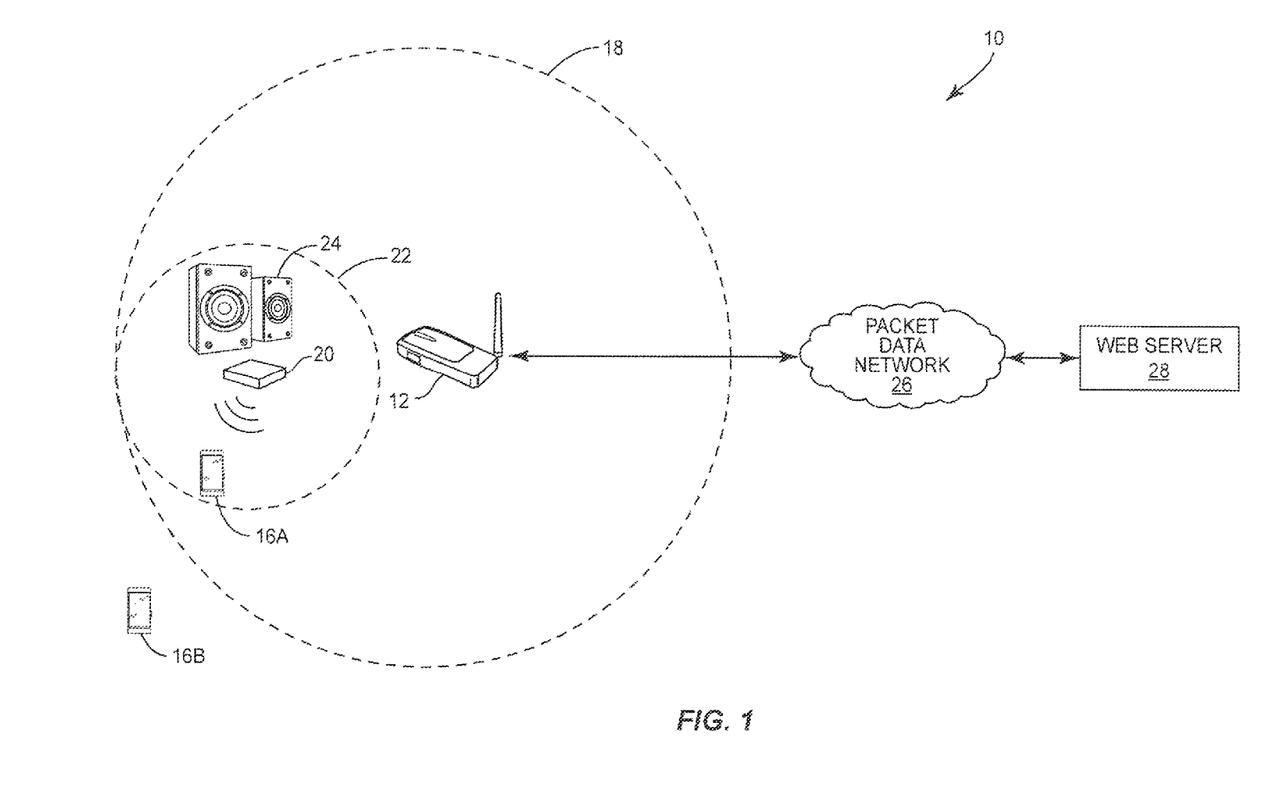
FIG. 1 illustrates an example wireless communication network.

FIG. 1 illustrates an example wireless communication network 10 in which a wireless access point 12 is configured to provide a WLAN connection for accessing one or more services either locally (e.g., a Universal Plug and Play service) or via a packet data network (PDN) 26. The WLAN connection is available to wireless terminals 16 residing within a coverage area 18 of the access point 12. The wireless terminals 16 may be cellular telephones, smartphones, personal digital assistants (PDAs), tablet computers, laptop computers, laptop embedded equipment (LEE), laptop mounted equipment (LME), or any other device equipped with wireless communication capabilities. In one or more embodiments the PDN 26 is the Internet.

A BLE beacon 20 having its own coverage range 22 periodically broadcasts service information and connectivity information for a non-BLE wireless connection to nearby wireless terminals 16. In the embodiment of FIG. 1, the non-BLE wireless connection is a WLAN connection. The BLE beacon 20 transmissions enable wireless terminals 16 to determine whether to establish the non-BLE connection to obtain the service(s) being advertised. Thus, instead of being required to first establish a non-BLE connection before learning about the service(s), wireless terminals 16 can now learn about advertised service(s) before a non-BLE connection is established.

In one example, the advertised service includes a video streaming service (e.g., the "Video Unlimited" service from SONY) and/or a music streaming service (e.g., the "Music Unlimited" service from SONY) which is available via a webserver 28 accessible through the PDN 26. In this example, the connection information could include credentials for connecting to the streaming service (e.g., a username and password) and/or credentials for connecting to the wireless access point 12 (e.g., one or more of a Service Set Identifier "SSID" WLAN network name, a radio frequency channel, and a security key of the wireless access point 12).

In one example, a service provided by some local device in proximity to the coverage area 18 is advertised through BLE transmissions. FIG. 1 illustrates an example in which WLAN-enabled speakers 24 are operable to playback music obtained via the wireless access point 12. In this example, the service information broadcasted by the BLE beacon 20 could include a service identifier indicating the presence of WLAN-enabled speakers, and optionally could include a specific identifier of the speakers themselves.

In one example, the connectivity information includes at least one of a Service Set Identifier (SSID), a channel, and a security key of the wireless access point, and the service information describes TCP/IP (Transmission Control Protocol/Internet Protocol) Internet access available via the wireless access point 12.

The BLE beacon 20 may be located in proximity to, may be affixed to, or may be included within a device providing the service. For example, if the offered service is streaming music to WLAN-enabled speakers 24, the BLE beacon 20 may reside within the speakers 24, or may be affixed to the speakers 24. In other embodiments, the BLE beacon may be nowhere near the device offering the service (e.g., if the service is offered by a remote web server 28).

Figure 2:
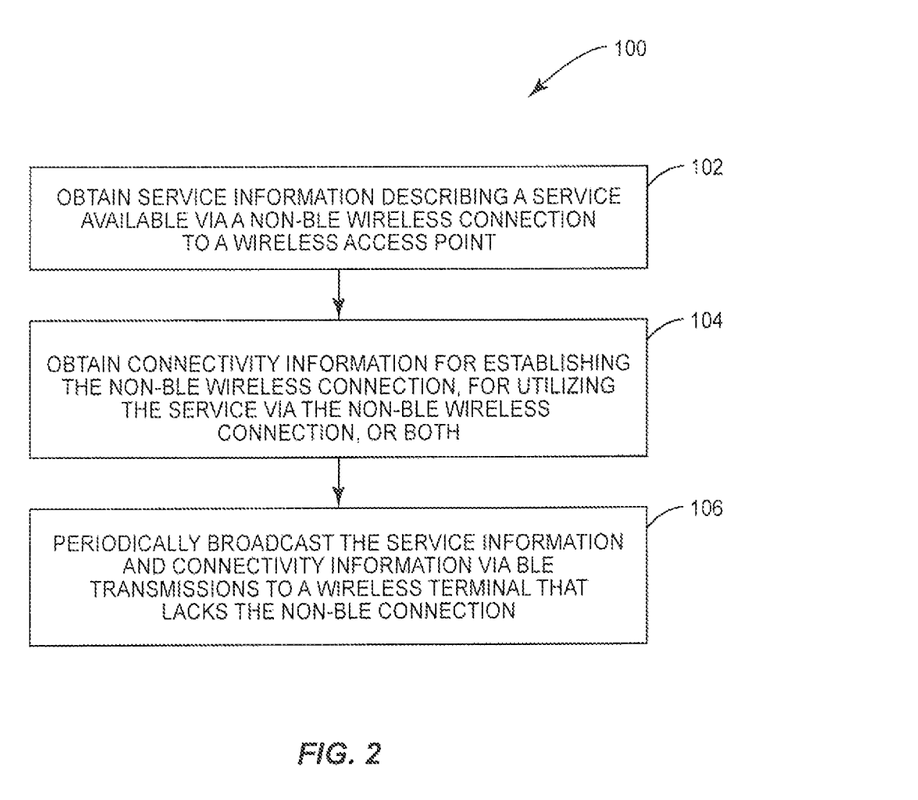
FIG. 2 illustrates a method of facilitating service usage by a wireless terminal.

FIG. 2 illustrates a method 100 of facilitating service usage by a wireless terminal 12. The method 100 is performed by a BLE beacon 20, such as the BLE beacon 20 shown in FIG. 1. The BLE beacon 20 obtains service information describing a service available via a non-BLE wireless connection (e.g., a WLAN connection) to a wireless access point (block 102). The BLE beacon also obtains connectivity information for establishing the non-BLE wireless connection, for utilizing the service via the non-BLE wireless connection, or both (block 104). The BLE beacon periodically broadcasts the service information and connectivity information via BLE transmissions to a wireless terminal that lacks the non-BLE wireless connection (block 106). In one or more embodiments, the broadcasting of block 106 is only performed when the BLE beacon 20 resides within a coverage area of the access point 12, such that connection information is not advertised for an unavailable connection (i.e., unavailable because the wireless terminal receiving a broadcast of the connection information would not be within range of the wireless access point to which the connection information applies).

The wireless terminal 16 lacking the non-BLE connection could mean that the wireless terminal 16 has never established the non-BLE connection to the wireless access point 12, or that the wireless terminal 16 has established the non-BLE connection to the wireless access point 12 before but currently lacks the connection (e.g., if the connection has been lost).

Figure 3:
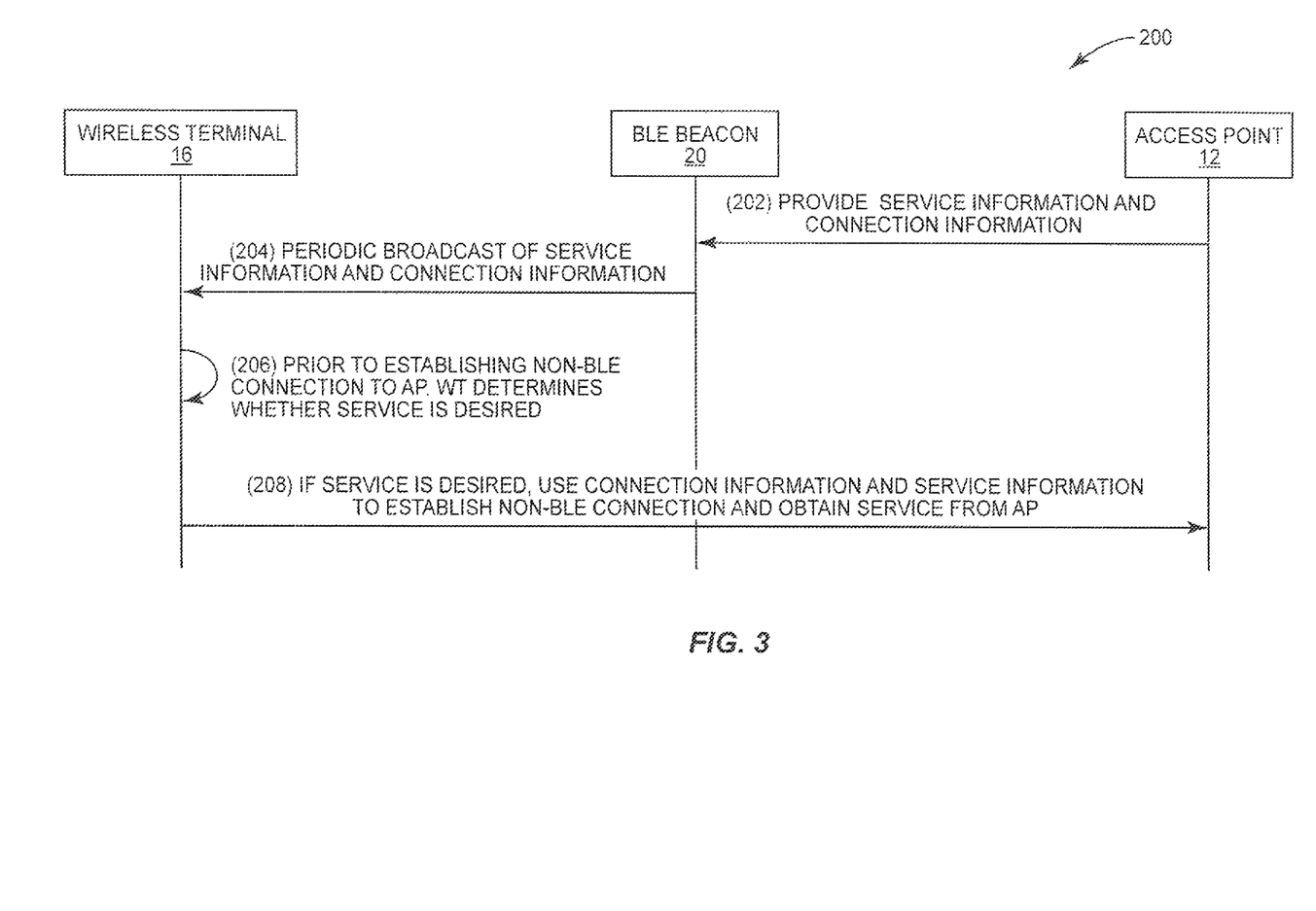
FIG. 3 illustrates an implementation of the method of FIG. 2 according to one embodiment.

FIG. 3 illustrates an implementation 200 of the method 100 of FIG. 2 according to one embodiment. The BLE beacon 20 obtains (202) service information and connection information from the wireless access point 12. The BLE beacon 20 then periodically broadcasts (204) the service and connection information via BLE transmissions. Upon receiving one of those transmissions, a wireless terminal 16, prior to establishing a non-BLE connection to the access point 12 using the non-BLE connection, determines whether the advertised service is desired (206). Thus, if the advertised service in FIG. 3 is streaming to WLAN-enabled speakers, in 206 the wireless terminal 16 would determine whether streaming music from the wireless terminal 16 to the WLAN-enabled speakers 24 is desired. This determination could be made through a user interface element on the wireless terminal (e.g., displaying a notification, or enabling an otherwise disabled option in a music playing application).

If the service is desired by the wireless terminal 16, then the connection and service information are used to establish the non-BLE connection and obtain the service from the access point 12. Otherwise, if the service is not desired, then the broadcasted service and connection information may simply be ignored.

Figure 4:
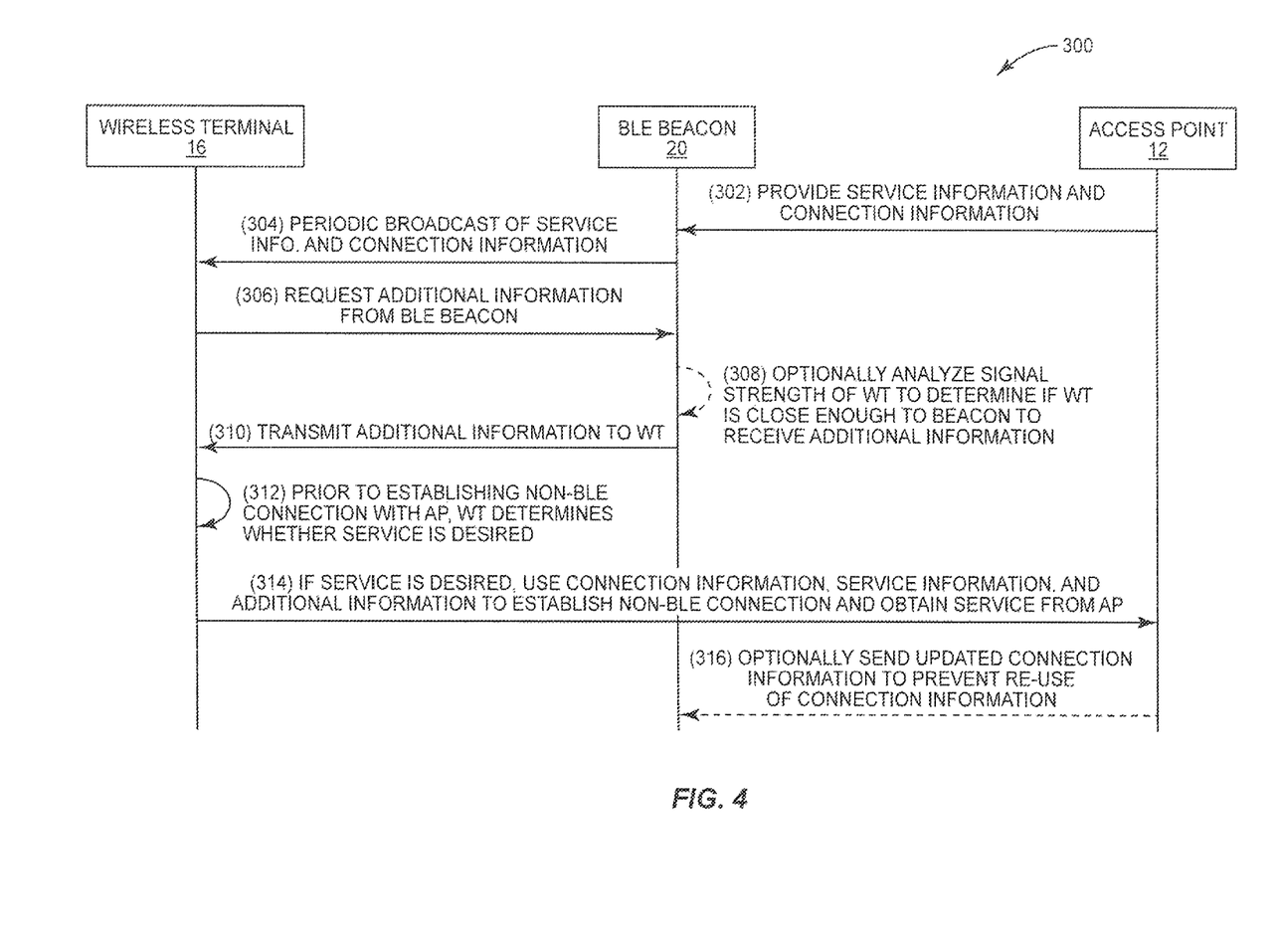
FIG. 4 illustrates an implementation of the method of FIG. 2 according to another embodiment.

FIG. 4 illustrates an implementation 300 of the method 100 of FIG. 2 according to another embodiment. The BLE beacon 20 obtains (302) service information and connection information from the wireless access point 12. The BLE beacon 20 then periodically broadcasts (304) the service and connection information via BLE transmissions. Upon receiving one of those transmissions, a wireless terminal 16 requests (306) additional information from the BLE beacon 20. For example, the wireless terminal 16 may request additional information needed to connect to access services through the wireless access point 12 (e.g., a WLAN passcode). Thus, in one or more embodiments, the connectivity information of both step 304 and step 310 are required for the wireless terminal to successfully establish the non-BLE wireless connection and utilize the service via the non-BLE wireless connection. Other examples of additional information that may be requested a network group identifier of the wireless access point 12, a WLAN MAC address of the wireless access point 12, or a Bluetooth address of the wireless access point (e.g., if the non-BLE connection is a classic Bluetooth connection). In one example, the additional information includes a Universal Plug and Play (UPnP) device identification string of a device providing a UPnP service through the wireless access point 12. In one or more embodiments, the additional information relates to service information, such as a supported video streaming codec, which could be used by the wireless terminal 16 to determine whether the wireless terminal 16 is able to utilize a video streaming service.

Optionally, the BLE beacon analyzes (308) a signal strength of the wireless terminal 16 (e.g., based on a signal strength of the request of 306) to determine if the wireless terminal is close enough to the BLE beacon 20 to receive the additional information. In one or more embodiments, this corresponds to the BLE beacon 20 comparing the wireless terminal 16 signal strength to a threshold to estimate whether the wireless terminal 16 is within the coverage area 22 of the BLE beacon 20, or is outside of that coverage area (e.g., a malicious user lingering outside a person's home). If the wireless terminal 16 is deemed to be too far away from the BLE beacon 20, the request of 306 may be rejected, effectively preventing the wireless terminal 16 from obtaining all of the connection information and/or service information needed to use the advertised service. This could prevent wireless terminal 16B which is outside the coverage area 22 of the BLE beacon 22 from obtaining the advertised connection information and service information, for example.

However, if the wireless terminal 16 is deemed to be close enough to the BLE beacon 20 (e.g., within coverage area 22), then the requested additional information is transmitted (310) to the wireless terminal 16. The wireless terminal 16, prior to establishing a non-BLE connection to the access point 12, determines (312) whether the advertised service is desired. If the service is desired, then the wireless terminal uses (314) the service information and connection information to obtain the service from the access point 12. Optionally, the access point 12 could then send (316) updated connection information to the BLE beacon 20, to prevent re-use of the connection information and/or service information (e.g., generating a new temporary "guest" WLAN password).

In some embodiments (e.g., that of FIG. 4 and step 316), at least a portion of the connectivity information is single-use connectivity information that that cannot be used once the wireless terminal moves out of the coverage area 22 of the BLE beacon 12. In the same or other embodiments, at least a portion of the connectivity information is single-use connectivity information that, once used by the wireless terminal 16 to establish the non-BLE wireless connection, cannot be reused once the wireless terminal 16 terminates the non-BLE wireless connection. Thus, if the connection information includes a passphrase, it may be updated as soon as one wireless terminal 16 has used the current passphrase to login (and/or as soon as the wireless terminal 16 leaves the coverage area 22). In one example, each passphrase is combined with the WLAN MAC address of the wireless terminal 16 using the passphrase further increase security. This would allow logging, monitoring, revoking of rights, etc. of connected wireless terminals.

For example, if the connection information includes WLAN credentials, one may only wish for a guest to be able to use the wireless access point 12 for a limited period of time (and not at a later date), for example only during the wireless terminal 16 is in range of the BLE beacon. In such examples, single-use connectivity information could be used so that a given wireless terminal 16 cannot re-use the connection information at a later date. If the connection information relates to connecting to a service (e.g., credentials for a video streaming service), one may wish to prevent the wireless terminal 16 from using those credentials at a remote location (e.g., once a visiting friend has returned to their home). In such examples, the single-use connectivity information could be used to prevent such undesired service access at a different location.

It is understood, of course, that the various steps shown in FIGS. 2-4 could be performed in different sequences than that illustrated in the Figures. For example, in FIG. 4 the wireless terminal 16 could make the determination of whether a service is desired (312) prior to requesting the additional information (306).

Whether the wireless terminal 16 has left the coverage area 22 of the BLE beacon 12 could be determined in a number of ways. In one example, a BLE connection is established between the wireless terminal 16 and the BLE beacon, and if that connection is dropped then the wireless terminal 16 is assumed to no longer be in the coverage area 22.

In one example, the BLE beacon 12 requests a response packet after each BLE broadcast transmission (without requiring a formal connection), and if no response packet is received then the wireless terminal 16 is assumed to no longer be in the coverage area 22

In one example, an updated encryption key could be included in BLE broadcast transmissions that is necessary to use the service in question (e.g., WLAN Internet connectivity). In this example, if a wireless terminal 16 left the coverage area 22 it would no longer receive updated encryption keys and would quickly become unable to decrypt wirelessly received data (e.g., IP packets).

BLE transmissions have been known to have a range on the order of 50 meters (approximately 160 feet). Depending on the placement of the BLE beacon 20 within the coverage area 18 of the access point, this may undesirably extend outside of a given structure (e.g., a home in which the wireless access point 12 is located). A range such as that could cause security concerns if, for example, a malicious user lingering outside the structure was attempting to obtain the service information and/or connection information being broadcast by the BLE beacon 20. Therefore, in one or more embodiments, a signal strength of the BLE beacon 20 is be intentionally limited to facilitate a relatively small coverage area 22 for the BLE beacon 20 (e.g., on the order of several meters). Such a limited range could offer greater security by only transmitting the connection information and service information to individuals in a smaller area (e.g., those permitted to be within the coverage area 18 of the wireless access point 12). In one or more embodiments, the transmission range could be limited to be similar to that of Near Field Communication (NFC) (e.g., on the order of 4-10 centimeters).

In one or more such embodiments, a request is received indicating a desired BLE beacon coverage area size (e.g., normal/low/very low), and based on that request the signal strength of the BLE beacon 20 is adjusted for the periodical broadcast of the service information and connectivity information. Thus, if a "very low" coverage area size is requested a lower signal strength could be used, and if a "normal" coverage area size is requested a higher signal strength could be used. If a user has heightened privacy concerns, for example, they may wish to tune the BLE beacon 12 to use a "low" or "very low" coverage area size.

When broadcasting the service information, the BLE beacon 20 uses a data structure to indicate the supported services. In one or more embodiments, this includes a multi-bit value, with different bit positions representing different service attributes, in a so-called bit mask. For example, an 8 bit value could be used where a '1' in bit position 1 represents the availability of service #1 (e.g., Wi-Fi speakers), a '1' in position 2 represents the availability of service #2 (e.g., screen mirroring over Wi-Fi), a '1' in position 3 represents the availability of service #3 (e.g., Bluetooth streaming audio), etc. If all three of those services were supported, a binary bit mask of "00000111" could be used to indicate that all three of the services were available through the wireless access point 12. In another example the bit mask is 64 or 128 bits long.

In one or more other embodiments, the service information comprises one or more multi-bit values, with each multi-bit value collectively serving as a single service attribute identifier. In such embodiments, a unique identifier (e.g., 16-128 bits long) could be used for each service. Thus, if multiple services were supported, an identifier for each service could be transmitted (e.g., one after the other).

In one example, the connection information includes information for connecting to the wireless access point 12 (e.g., one or more of a Service Set Identifier "SSID" WLAN network name, a channel, and a passcode/authentication key for the wireless access point 12). Nearby devices (e.g., wireless terminal 16A) could then use that connection information to connect to the advertised WLAN network. WLAN protected setup or other methods could be used to feed such WLAN network configuration data into the wireless terminal 16A device. For some devices (e.g., those running the ANDROID operating system), a WLAN network item could be added to a list of WLAN networks using one or more available APIs.

In one example, the advertised service is generic WLAN connectivity to the Internet, and includes login details and an address of the wireless access point 12.

As discussed above, in one example the service information describes how to use WLAN-enabled speakers (e.g., an indication that WLAN-enabled speakers are available, an address of the speakers, supported audio formats for the speakers, etc.). In one example, the advertised services include file sharing, screen mirroring, geographical position reporting, and/or defined application services such voice/video services. Some example voice/video services may include, for example, SKYPE, music streaming (e.g., Music Unlimited from SONY), or video streaming side (e.g., Video Unlimited from SONY). In such examples, the service information may include login credentials such as a Video Unlimited username and password to facilitate utilization of the Video Unlimited service. In one or more example, the service information and/or connection information relates to connecting to a Universal Plug and Play (UPnP) device for sharing media via the wireless access point 12. Of course, these are only non-limiting examples, and it is understood that other services could be advertised. Also it is understood that various combinations of services could be advertised, as discussed above.

The BLE beacon 20 may optionally use encryption when transmitting the service information and connection information. This could provide a useful way to limit use of the connection information and service information to a limited subset of users, such as expected guests or a premium class of customers (e.g., rewards members of a hotel) who were provided with encryption information in advance (e.g., an encryption key). Likewise, the use of encryption could prevent access to other users, such as unauthorized intruders or non-premium customers, who do not possess the required encryption information.

In one or more embodiments, whether encryption is used depends on the connection information and/or service information being advertised, the physical location of the BLE beacon 12, and/or the transmission range of the BLE beacon 20. For example, if a relatively larger coverage area 22 is being used for the BLE beacon encryption may be more desirable, whereas if a relatively smaller coverage area 22 is being used then encryption may be less desirable. Also, if the service being advertised provides access to secure data, then encryption may be more desirable (e.g., access to a home file server), than if the service being advertised involves less secure information (e.g., streaming music to WLAN-enabled speakers).

By continually broadcasting device and/or service discovery information, the BLE beacon 20 can effectively facilitate the use of those services by nearby wireless terminals 16 within a desired proximity coverage area 22, and optionally with sufficient security clearance (e.g., encryption key(s)). The receiving wireless terminals 16 can be configured, by communicating with the BLE beacon 20, to connect to the wireless access point 12 and to connect to and use services offered by the wireless access point 12.

Although connection information for WLAN connections has been discussed above, it is understood that other types of non-BLE wireless connections could be possible. In one or more embodiments, the connection information describes how to establish a non-BLE "classic" Bluetooth connection to a wireless access point 12. In one example the service being advertised is streaming audio to Bluetooth-enabled speakers. In this example, the connection information could include a Bluetooth Device Address and Bluetooth passphrase and/or encryption key(s) for establishing a non-BLE classic Bluetooth connection, and the service information could describe various aspects of the Bluetooth audio streaming.

In one or more embodiments, the connectivity information relates to a plurality of different types of non-BLE wireless connections (e.g., a WLAN connection and a Bluetooth classic connection), and the service information describes a plurality of services offered via the plurality of non-BLE wireless connections (e.g., video streaming via the WLAN connection, and audio streaming via the Bluetooth classic connection).

Figure 5:
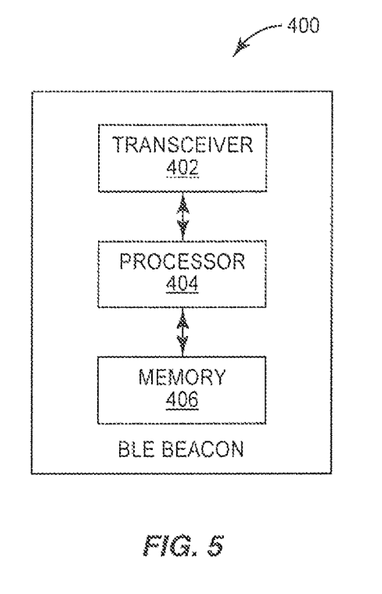
FIG. 5 illustrates an example BLE beacon.

Referring now to FIG. 5, a BLE beacon 400 is illustrated that may be used as the BLE beacon 20 of FIG. 1. The BLE beacon 400 includes a BLE transceiver 402, a processor 404, and a memory circuit 406. The processor 404 includes one or more processor circuits (e.g., one or more microprocessors, microcontrollers, Application Specific Integrated Circuits (ASICs), or the like), configured with appropriate software and/or firmware to carry out one or more of the techniques discussed above. The one or more processing circuits are configured to obtain service information describing a service available via a non-BLE wireless connection to a wireless access point. The one or more processing circuits are also configured to obtain connectivity information for establishing the non-BLE wireless connection, for utilizing the service via the non-BLE wireless connection, or both. The one or more processing circuits are further configured to periodically broadcast the service information and connectivity information via BLE transmissions from the transceiver to a wireless terminal that lacks the non-BLE wireless connection. The BLE beacon 400 also includes a memory circuit 406 that comprises a non-transitory computer readable medium storing program instructions, such as a computer program product, that configures the BLE beacon 400 to implement the techniques discussed above. The BLE beacon 400 may also include an energy storage device, such as a battery (not shown). Because BLE beacons have been known to have extended battery lives (e.g., on the order of a 2 year battery life from a coin-sized battery), charging of the energy storage device may occur infrequently or may not be performed at all.

Figure 6:
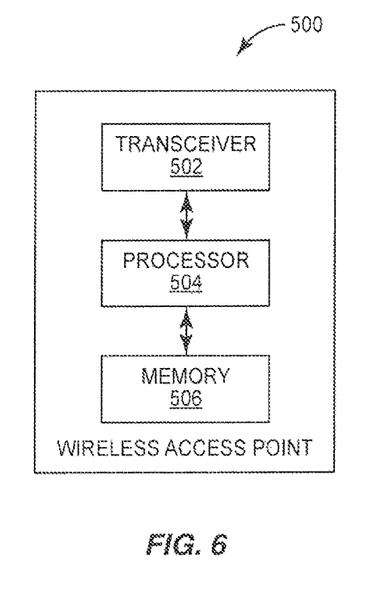
FIG. 6 illustrates an wireless access point.

FIG. 6 illustrates a wireless access point 500 that may be used as the wireless access point 12 of FIG. 1. The wireless access point 500 includes a transceiver 502, a processor 504, and a memory circuit 506. In one or more embodiments, the transceiver is a WLAN transceiver implementing one or more of the IEEE 802.11 standards. In one or more embodiments, the transceiver 502 is a non-BLE "classic" Bluetooth transceiver (or is a transceiver that implements both BLE and non-BLE standards). The processor 504 includes one or more processor circuits (e.g., one or more microprocessors, microcontrollers, Application Specific Integrated Circuits (ASICs), or the like), configured with appropriate software and/or firmware to carry out one or more of the techniques discussed above. The one or more processing circuits are configured to provide service information and connection information to BLE beacon 400. Optionally, the one or more processing circuits are further configured to send updated connection information once the connection information has been used (see, e.g., 316 in FIG. 4). The memory circuit 506 comprises a non-transitory computer readable medium storing program instructions, such as a computer program product, that configures the wireless access point 500 to implement the techniques discussed above.

Figure 7:
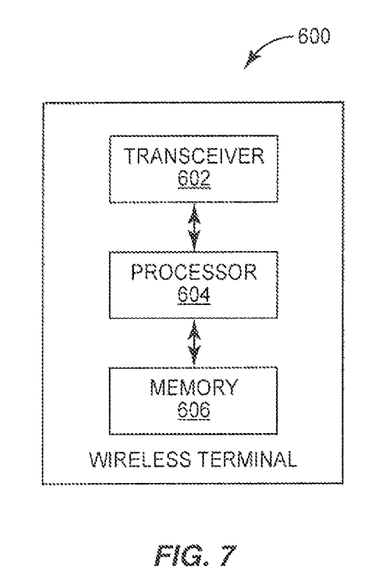
FIG. 7 illustrates an example wireless terminal.

FIG. 7 illustrates a wireless terminal 600 that may be used as the wireless terminal 16 of FIG. 1. The wireless terminal 600 includes a transceiver 602, a processor 604, and a memory circuit 606. In one or more embodiments, the transceiver serves as a WLAN transceiver implementing one or more of the 802.11 standards, and also serves as a BLE transceiver operative to receive and transmit BLE transmissions with a BLE beacon. Alternatively, multiple transceivers may be used (one for using BLE and one for using a non-BLE standard, such as WLAN). The processor 604 includes one or more processor circuits (e.g., one or more microprocessors, microcontrollers, Application Specific Integrated Circuits (ASICs), or the like), configured with appropriate software and/or firmware to carry out one or more of the techniques discussed above. The one or more processing circuits are configured to receive service information and connection information from a BLE beacon, and to use that information to establish a non-BLE connection and obtain the advertised service through a wireless access point. The memory circuit 606 that comprises a non-transitory computer readable medium storing program instructions, such as a computer program product, that configure the wireless terminal 600 to implement the techniques discussed above. In one or more embodiments, the computer program product is a utility stored on the wireless terminal 600 that facilitates usage of the connection information and service information with little or no user interaction. In one example, if a given service is available an indication is provided to a user of the wireless terminal 600 (e.g., a message or icon or some other graphical user interface element such as a button appears), and if accepted the non-BLE connection is automatically established and the service is automatically initiated.

The techniques described above provide an advantageous service discovery method that can facilitate configuration of network connections and service usage quickly and efficiently. Moreover, by informing wireless terminals 16 about what services are available before those terminals establish a non-BLE connection, the terminals can decide whether or not it is desirable to establish the non-BLE connection at all.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method of facilitating service usage by a wireless terminal, the method being implemented by a Bluetooth low energy (BLE) beacon comprising:
    obtaining service information describing a service available via a non-BLE wireless connection to a wireless access point;
    obtaining connectivity information for establishing the non-BLE wireless connection, for utilizing the service via the non-BLE wireless connection, or both of the non-BLE and BLE wireless connections; and
    periodically broadcasting the service information and connectivity information via BLE transmissions to a BLE-enabled wireless terminal that lacks the non-BLE wireless connection.

2. The method of claim 1:
    wherein the non-BLE wireless connection to the wireless access point is a Wireless Local Area Network (WLAN) connection; and
    wherein the connectivity information includes at least one of a Service Set Identifier (SSID), a channel, and a security key of the wireless access point.

3. The method of claim 1:
    wherein the connectivity information relates to a plurality of different types of non-BLE wireless connections; and
    wherein the service information describes a plurality of services offered via the plurality of non-BLE wireless connections.

4. The method of claim 1:
    wherein at least a portion of the connectivity information is single-use connectivity information that cannot be used once the wireless terminal moves out of a coverage area of the BLE beacon; or
    wherein at least a portion of the connectivity information is single-use connectivity information that, once used by the wireless terminal to establish the non-BLE wireless connection, cannot be reused after the wireless terminal terminates the non-BLE wireless connection.

5. The method of claim 1, further comprising:
    receiving a request for a BLE beacon coverage area size; and
    adjusting a signal strength used for the periodic broadcasting of the service information and connectivity information based on the requested BLE beacon coverage area size.

6. The method of claim 1, wherein the connectivity information is first connectivity information, the method further comprising:
    obtaining different, second connectivity information for establishing the non-BLE wireless connection with the wireless access point, for utilizing the service via the non-BLE wireless connection, or both;
    based on the periodic broadcasting, receiving a response from the wireless terminal; and
    selectively transmitting the second connectivity information to the wireless terminal based on whether the response meets a predefined criteria;
    wherein both the first and second connectivity information are required for the wireless terminal to successfully establish the non-BLE wireless connection and utilize the service via the non-BLE wireless connection.

7. The method of claim 1, wherein the periodic broadcasting is only performed when the BLE beacon resides within a coverage area of the access point.

8. The method of claim 1, wherein the service information comprises a multi-bit value, with different bit positions representing different service attributes.

9. The method of claim 1, wherein the service information comprises one or more multi-bit values, each multi-bit value collectively serving as a single service attribute identifier.

10. A Bluetooth low energy (BLE) beacon comprising:
    a transceiver; and
    one or more processing circuits configured to:
        obtain service information describing a service available via a non-BLE wireless connection to a wireless access point;

obtain connectivity information for establishing the non-BLE wireless connection, for utilizing the service via the non-BLE wireless connection, or both of the non-BLE and BLE wireless connections; and periodically broadcast the service information and connectivity information via BLE transmissions from the transceiver to a BLE-enabled wireless terminal that lacks established the non-BLE wireless connection.

11. The BLE beacon of claim 10:
wherein the non-BLE wireless connection to the wireless access point is a Wireless Local Area Network (WLAN) connection; and
wherein the connectivity information includes at least one of a Service Set Identifier (SSID), a channel, and a security key of the wireless access point.

12. The BLE beacon of claim 10:
wherein the connectivity information relates to a plurality of different types of non-BLE wireless connections; and
wherein the service information describes a plurality of services offered via the plurality of non-BLE wireless connections.

13. The BLE beacon of claim 10:
wherein at least a portion of the connectivity information is single-use connectivity information that cannot be used once the wireless terminal moves out of a coverage area of the BLE beacon; or
wherein at least a portion of the connectivity information is single-use connectivity information that, once used by the wireless terminal to establish the non-BLE wireless connection, cannot be reused after the wireless terminal terminates the non-BLE wireless connection.

14. The BLE beacon of claim 10, wherein the one or more processing circuits are further configured to:
receive, via the transceiver, a request for a BLE beacon coverage area size; and
adjust a signal strength used for the periodic broadcasting of the service information and connectivity information based on the requested BLE beacon coverage area size.

15. The BLE beacon of claim 10, wherein the connectivity information is first connectivity information, and the one or more processing circuits are further configured to:
obtain different, second connectivity information for establishing the non-BLE wireless connection with the wireless access point, for utilizing the service via the non-BLE wireless connection, or both;
based on the periodic broadcasting, receive a response from the wireless terminal; and
selectively transmit the second connectivity information to the wireless terminal based on whether the response meets a predefined criteria;
wherein both the first and second connectivity information are required for the wireless terminal to successfully establish the non-BLE wireless connection and utilize the service via the non-BLE wireless connection.

16. The BLE beacon of claim 10, wherein the one or more processing circuits are configured to perform the periodic broadcasting only when the BLE beacon resides within a coverage area of the access point.

17. The BLE beacon of claim 10, wherein the service information comprises a multi-bit value, with different bit positions representing different service attributes.

18. The BLE beacon of claim 10, wherein the service information comprises one or more multi-bit values, each multi-bit value collectively serving as a single service attribute identifier.

* * * * *